E. M. FITZ.
ELECTRIC GENERATING MACHINE.
APPLICATION FILED OCT. 21, 1908.
947,279.
Patented Jan. 25, 1910.
2 SHEETS—SHEET 1.
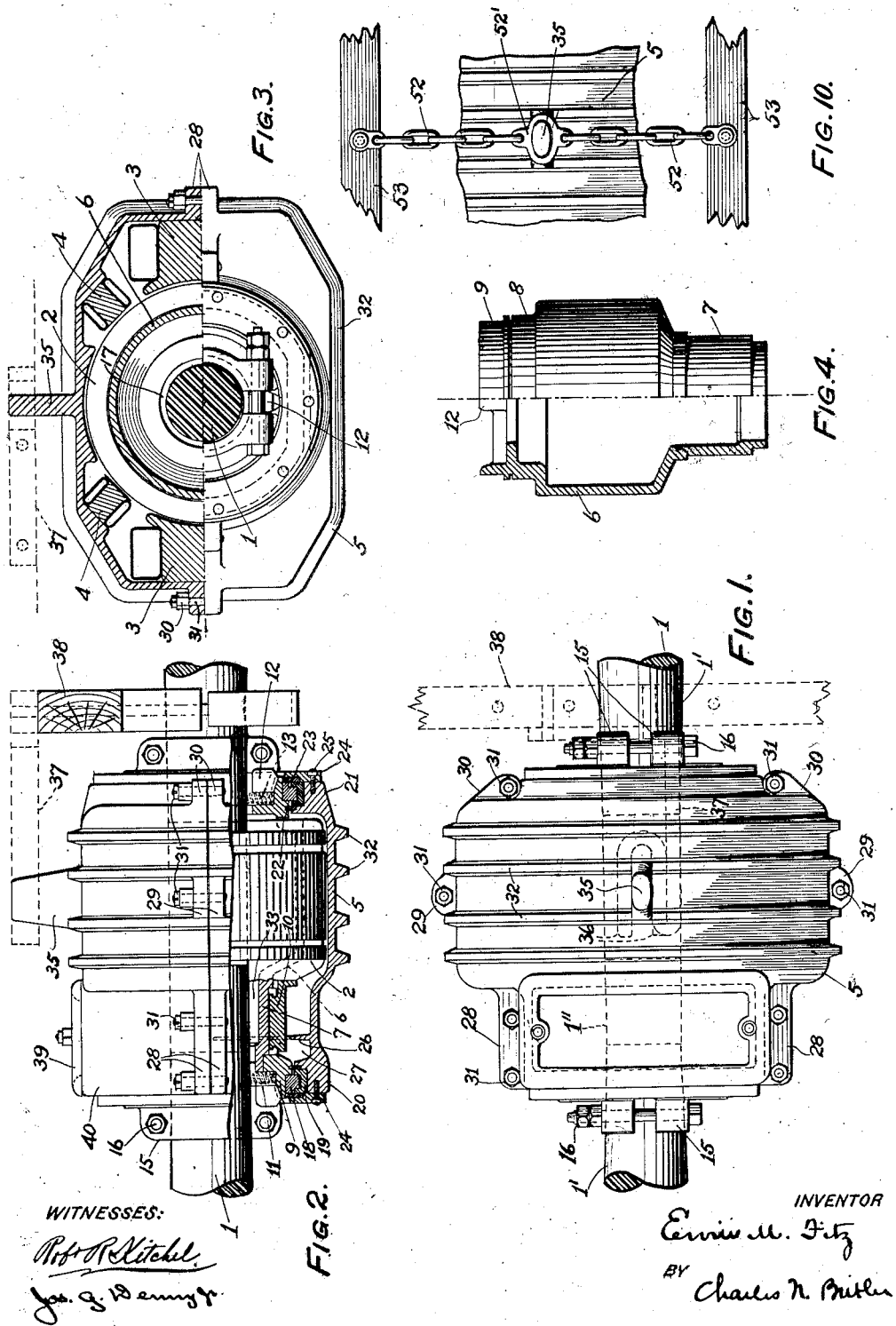

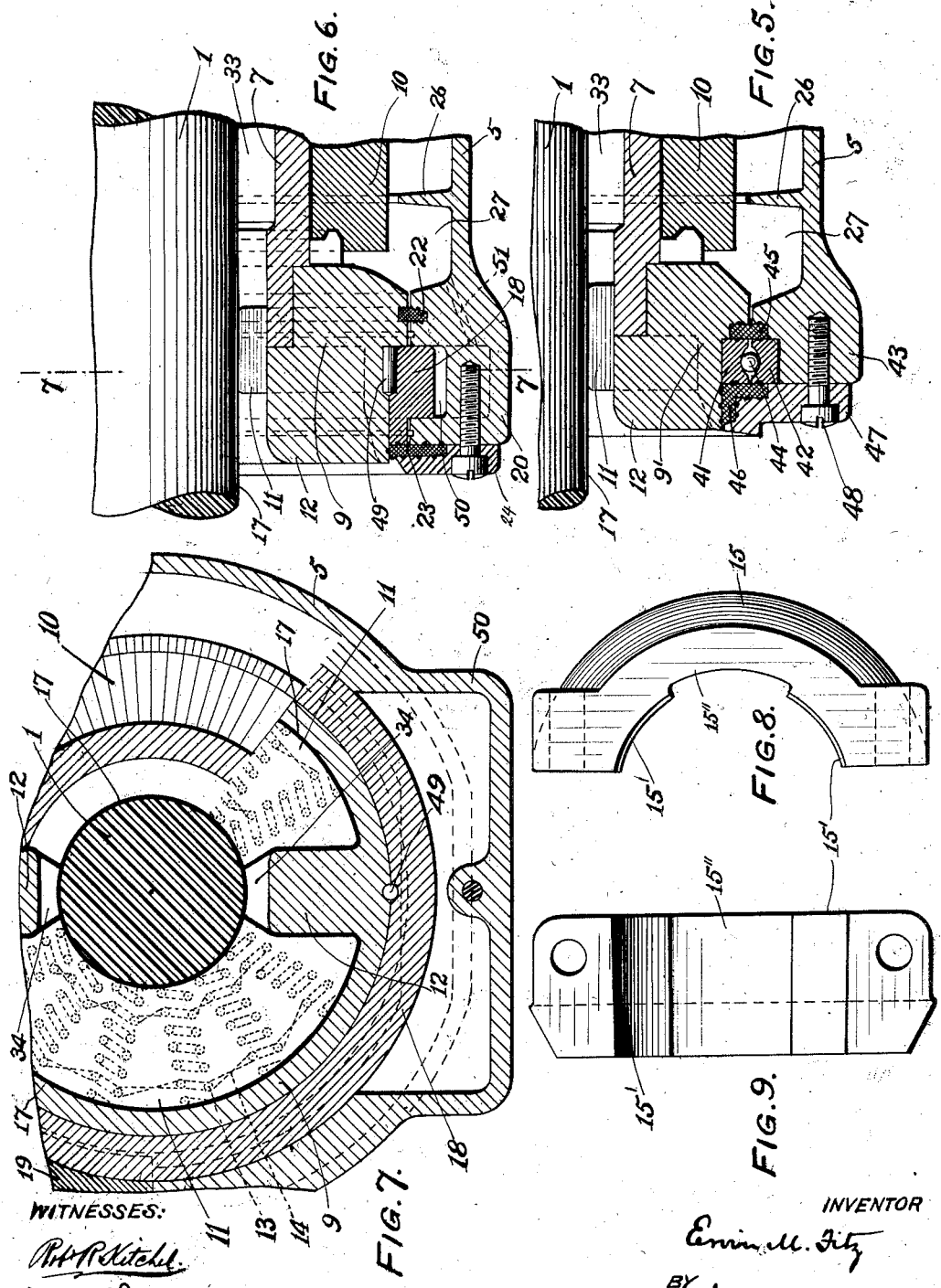

UNITED STATES PATENT OFFICE.

ERVIN M. FITZ, OF COLUMBUS, OHIO.

ELECTRIC GENERATING-MACHINE.

947,279.  Specification of Letters Patent.  Patented Jan. 25, 1910.

Application filed October 21, 1908. Serial No. 458,789.

*To all whom it may concern:*

Be it known that I, ERVIN M. FITZ, a citizen of the United States, residing in the city of Columbus, county of Franklin, and State of Ohio, have invented Improvements in Electric Generating-Machines.

My invention is an electric generating machine, designed particularly to be carried and operated by the axle of a car or locomotive, primarily for train lighting.

A leading object of the invention is to provide an improved axle electric generating machine that will operate successfully at all times, under all conditions of service and weather, with the minimum expense and attention.

A further object is to provide improved means whereby electric energy can be supplied constantly and storage batteries kept charged so that a constant supply of discharge current is available for lighting or other purposes when trains run at low speed or are stationary, permitting the use of storage batteries of smaller capacity than usual and avoiding the deterioration due to usual overdrafts of energy therefrom.

A further object is to provide, in an axle operated machine, simplicity of construction, durability in operation, adaptability to universal service and ready assemblage and dissociation of parts.

A further object is to support the mechanism independently of the truck frame with the armature securely fixed to the axle and a casing containing field magnets held against rotation, with the minimum tendency to injury, with the parts held in proper axial alinement, and with bearings that are tight and true in operation.

A further object is to provide a construction having working parts that are protected, with provision for ventilation and with large exterior exposure for the radiation of heat.

The characteristic features of the invention are fully disclosed in the accompanying drawings and the following description thereof.

In the drawings, Figure 1 is a plan view of a construction embodying the invention; Fig. 2 is a side elevation of the same showing parts of the mechanism in section; Fig. 3 is an end elevation shown partially in section; Fig. 4 is a sectional plan view of the armature shell; Fig. 5 is an axial sectional view taken through a form of bearing used and parts connected therewith; Fig. 6 is a view similar to that shown in Fig. 5 showing a modification in construction; Fig. 7 is an irregular transverse view taken on the line 7—7 of Fig. 6; Fig. 8 is a side view of a clamping dog; Fig. 9 is an interior view of the clamping dog shown in Fig. 8; and Fig. 10 is a plan view of a modified form of connector for holding the casing against rotation.

The axle 1 with the sections 1' tapering toward each other and the reduced intermediate section 1'' has fixed thereon the armature 2 which is revolved in the field of the magnets 3 and 4 carried within a non-revoluble casing 5 inclosing the armature. The armature has the hollow shell 6 provided with the hubs 7 and 8 having the bearing rings 9 or 9', the commutator ring 10 being fixed on the hub 7 within the ring 9 or 9' thereon. Circular elastic blocks or cushions 11, preferably of L-shaped cross section, are fitted to the axle sections 1' within the hubs 7 and 8 and the bearing rings 9 or 9' thereof, the rings having the inwardly extending lugs 12 between which the blocks are held. The blocks 11 are suitably formed of rubber or cork having embedded therein the radially disposed coiled springs 13 connected by the flexible links 14.

Clamping dogs 15, having conical interior bearing surfaces 15' which fit the tapered axle sections 1' and cored sections 15'' between the surfaces 15' to improve the bearing of the latter, are fixed to the axle by the bolts 16, engage the blocks 11 to hold them in position against the rings 9, and engage the lugs 12 to revolve the armature. The tapered bearing surfaces of the axle engaged by the tapered bearing surfaces of the dogs give the latter a tendency to move toward each other and prevent them from moving away from their engagement with the armature so that the latter is kept securely in position.

The insulations 17 are disposed between the axle and the bearing blocks and between the latter and the armature rings to electrically separate the armature and axle.

The rings 9, as shown in Figs. 2, 6, and 7 have on the peripheries thereof the rings 18 of L-shaped cross section. On the outwardly projecting parts of the rings 18 are fitted the segmental channels 19 set within the ends or hubs 20 and 21 of the casing, the channels being full rings as used in the construction of Fig. 1, and half rings as used in the constructions shown in Figs. 6 and 7. Interior packing rings 22 are fitted in suitable recesses in the rings 9 and hubs 20 and 21, the channels 19 fitting against them to hold them in place, and exterior packing rings 23 cover the exteriors of the joints between the rings 18 and 19, the rings 23 being held in place by circular plates 24 connected by bolts 25 with the respective casing ends.

The packing rings are made, suitably, of finely woven or compressed wool, or material of soft, springy and absorbent character, disposed to prevent the escape of lubricant and the entrance of water, dirt or other foreign materials.

The interior of the casing 2 is provided with the inwardly projecting flange 26 forming a guard against splashing oil and an oil channel 27 for lubricating the bearing adjacent thereto. The exterior of the casing is formed of separable halves, having registering flanges 28, 29 and 30 connected by the bolts 31, and is provided with the ribs 32 which increase the radiating surface.

The generating mechanism is held clear of the axle so that there is an air chamber 33 surrounding the axle within the armature shell, which is ventilated through openings 34 between the blocks 11, whereby air circulates in contact with the interior of the shell.

A lug 35 on the casing is engaged in an open eye between the bifurcations 36 of a spring or elastic bar 37 which is fixed to a part 38 of the truck frame, as the wheel guard. The bar has the necessary strength to hold the casing against rotation under normal conditions but is adapted for giving way and releasing the casing in the event of the latter being forced, to avoid breaking or injuring the generator.

A cover plate 39 gives access to the casing box 40 above the commutator.

As shown in Fig. 5, the shell 7 may have on the ends thereof rings 9', between which and the casing hubs 43 are the concentrically disposed race rings 41 and 42, the former being set on the rings 9' and the latter in the hubs 43. Balls 44 run between the race rings, the joints between which are covered and sealed by the packings 45 and 46. The several parts are held together by circular plates 47 connected by bolts 48 to the casing hubs 43 and directly engaging the packings 46.

As shown in Figs. 6 and 7, the ring 18, held on the ring 9 by the pin 49, revolves in an oil cup 50 connected with the oil channel 27 of the casing 5 by a duct 51.

As shown in Fig. 10, the casing 5 may be held loosely against rotation by a chain 52 having an eye 52' which engages the casing lug 35 while its ends are fixed to the truck members 53, the construction being such that it will release the casing in the event of its being caught or subjected to abnormal conditions.

Having described my invention, I claim:

1. In an electric generating machine, in combination with an axle, an armature having a shell sleeved on and secured to said axle, a casing having field magnets inclosed therein, journal bearings connecting hubs on said shell and the ends of said casing, and means for holding said casing against revolution with said armature.

2. In an electric generating machine, in combination with an axle, elastic bearings supported by said axle, an armature having a shell with a ring at each end thereof engaging said bearings, inclosing said armature a casing having field magnets therein, and bearings within which said rings are journaled, and means for fixing said rings and armature to said axle.

3. In an electric generating machine, in combination with an axle, an armature having a shell with contracted ends, elastic blocks supported by said axle, means whereby the ends of said shell are supported by said blocks, devices clamped on said axle for fixing said armature thereto, surrounding said armature a casing containing field magnets, journal bearings whereby the ends of said shell and casing are connected, and means for holding said casing against revolution.

4. In an electric generating machine, in combination with an axle, an armature having a one piece shell with a contracted end provided with a commutator and a bearing ring, one or more elastic bearings disposed between said axle and shell so that said shell is cushioned and an air space provided between it and the axle, means fixed to said axle and bearing ring for holding said armature to said axle, surrounding said armature a casing having magnets therein, means whereby said ring is journaled in an end of said casing, and means for holding said casing against revolution.

5. In an electric generating machine, in combination with an axle, an armature having a shell with inwardly projecting flanges at the ends thereof, said shell and axle being separated to provide an air space between them, elastic blocks between said axle and ends, said blocks being engaged between said flanges and providing a passage or passages communicating with said air space between said axle and shell, surrounding said armature a casing containing magnets, and journal bearings between the ends of said shell and said casing.

6. In an electric generating machine, in combination with an axle, on said axle an armature having a shell with an end ring thereon, said ring having inwardly projecting flanges, within said ring between said projections and carried by said axle blocks comprising elastic material with radially disposed coiled springs therein, surrounding said armature a casing having field magnets therein, means whereby said armature and casing are journaled and held in alinement one with respect to the other, and means for holding said casing against revolution.

7. In an electric generating machine, in combination with an axle, sleeved on said axle an armature having a shell with a contracted end, on said end a commutator ring and a bearing ring, between said bearing ring and axle elastic means for supporting said armature, means clamped on said axle and engaging said bearing ring for fixing said armature to said axle, surrounding said armature a casing having magnets therein, journal bearing members between said ring and casing, and an oil receptacle communicating with said journal bearing members.

8. In an electric generating machine, in combination with an axle, an armature having a shell with an end bearing ring having one or more lugs, and clamping dogs engaging said axle and lugs to fix said parts together.

9. In an electric generating machine, in combination with an axle, an armature having a shell with lugs projecting inwardly, elastic blocks engaged by said lugs between said axle and hub, and clamping dogs engaging said axle and lugs to fix said parts together.

10. In an electric generating machine, in combination with an axle, sleeved on and out of contact with said axle an armature having a shell with end bearing rings, means whereby said axle supports said armature, means for fixing said armature to said axle, bearing rings fixed on said bearing rings first named, surrounding said armature a casing having magnets therein and on the ends thereof bearings engaging the second named bearing rings, means for holding said bearing members together so as to prevent lateral movement of one with relation to another, means in said casing for lubricating the journal formed by said bearing members, and means for holding said casing against rotation.

11. In an electric generating machine, in combination with a truck and an axle, an armature fixed on said axle, an inclosing casing having bearings within which journals of said armature are revoluble, coacting with said armature field magnets inclosed and carried by said casing, and an elastic bar connecting said casing and truck.

12. In an electric generating machine, in combination with an axle and a truck frame, an armature fixed on said axle, a casing having bearings within which journals on said armature are revoluble, said casing having a lug thereon, and a bar fixed to said frame and having an automatically separable engagement with said lug.

13. In an electric generating machine, an armature shell having journals on the ends thereof, a revoluble axle having a tapered section, clamping dogs engaging said section whereby said armature shell is fixed, and a casing containing field magnets coacting with said armature and having bearings carried by said journals.

14. In an electric generating machine, a revoluble axle having sections tapering toward each other, an armature thereon, clamping devices having bearings adapted for engaging said section, means for engaging said devices and armature, mechanism for carrying one or more field magnets coacting with said armature and carried by said axle, and means adapted for holding said mechanism against revolution under normal conditions and releasing it when subjected to abnormal conditions.

15. In an electric generating machine, an axle having sections tapering toward each other, an armature sleeved on said axle, bearing rings on the ends of said armature, elastic devices disposed between said axle and rings to cushion said armature, and clamping devices having bearing surfaces adapted for engaging said tapered sections and means for engaging said rings, said clamping devices holding said elastic devices and said armature in position.

In witness whereof I have hereunto set my name this 16 day of October, A. D. 1908, in the presence of the subscribing witnesses.

ERVIN M. FITZ.

Witnesses:
T. M. LIVESAY,
L. B. JONES.